US008867858B2

(12) United States Patent
Fattal et al.

(10) Patent No.: US 8,867,858 B2
(45) Date of Patent: Oct. 21, 2014

(54) METHOD AND SYSTEM FOR GENERATING AN OUTPUT IMAGE OF INCREASED PIXEL RESOLUTION FROM AN INPUT IMAGE

(75) Inventors: Raanan Fattal, Jerusalem (IL); Gilad Freedman, Hoshaya (IL)

(73) Assignee: Yissum Research Development Company of the Hebrew University of Jerusalem, Ltd., Jerusalem (IL)

( * ) Notice: Subject to any disclaimer, the term of this patent is extended or adjusted under 35 U.S.C. 154(b) by 179 days.

(21) Appl. No.: 13/575,543

(22) PCT Filed: Jan. 27, 2011

(86) PCT No.: PCT/IL2011/000094
§ 371 (c)(1),
(2), (4) Date: Aug. 23, 2012

(87) PCT Pub. No.: WO2011/092696
PCT Pub. Date: Aug. 4, 2011

(65) Prior Publication Data
US 2012/0328210 A1 Dec. 27, 2012

Related U.S. Application Data

(60) Provisional application No. 61/299,036, filed on Jan. 28, 2010.

(51) Int. Cl.
*G06K 9/40* (2006.01)
*G06K 9/32* (2006.01)
*G06T 3/40* (2006.01)

(52) U.S. Cl.
CPC ..................................... *G06T 3/403* (2013.01)
USPC .......................................... 382/264; 382/299

(58) Field of Classification Search
CPC ..... G06T 3/403; G06T 3/4023; G06T 3/4053; G06T 3/40; G06T 5/001; G06T 5/004; H04N 1/40068
USPC .................................. 382/264, 298, 299, 305
See application file for complete search history.

(56) References Cited

U.S. PATENT DOCUMENTS

| 5,537,495 | A   | * | 7/1996  | Overton ......................... 382/269 |
| 7,447,382 | B2  | * | 11/2008 | Nestares et al. ............... 382/299 |
| 7,840,095 | B2  | * | 11/2010 | Yamada ......................... 382/299 |
| 8,115,864 | B2  | * | 2/2012  | Palfner .......................... 348/448 |
| 8,570,389 | B2  | * | 10/2013 | Sorek et al. ................. 348/222.1 |

OTHER PUBLICATIONS

European Search Report, Oct. 7, 2013 for Application No. 11 706 932.8-1906.
Weiman, Carl F. R., "Continuous Anti-Aliased Rotation and Zoom of Raster Images", 1980, Simulation and Control Systems, General Electric, Daytona Beach, Florida, pp. 286-293.

* cited by examiner

*Primary Examiner* — Kanjibhai Patel
(74) *Attorney, Agent, or Firm* — Moser Taboada

(57) ABSTRACT

A method and system (30) generates an output image (21) of increased pixel resolution from an input image (20), which is non-dyadically upscaled to generate an upscaled image (22) having more pixels than the input image and is low-pass filtered to generate a smoothed image (23). A high detail image (24) is generated by subtraction and for each pixel in the upscaled image, a patch (25) containing the pixel is identified. A best-fit patch (26) within a localized region (27) of the smoothed image is found by searching in the smoothed image in close proximity to a mapped location of the patch in the upscaled image. Each pixel in the patch of the upscaled image is corrected by uniquely adding the value of the corresponding pixel in an equivalent patch of the high detail image corresponding to the best-fit patch, and the corrected upscaled image is stored for further processing.

20 Claims, 8 Drawing Sheets

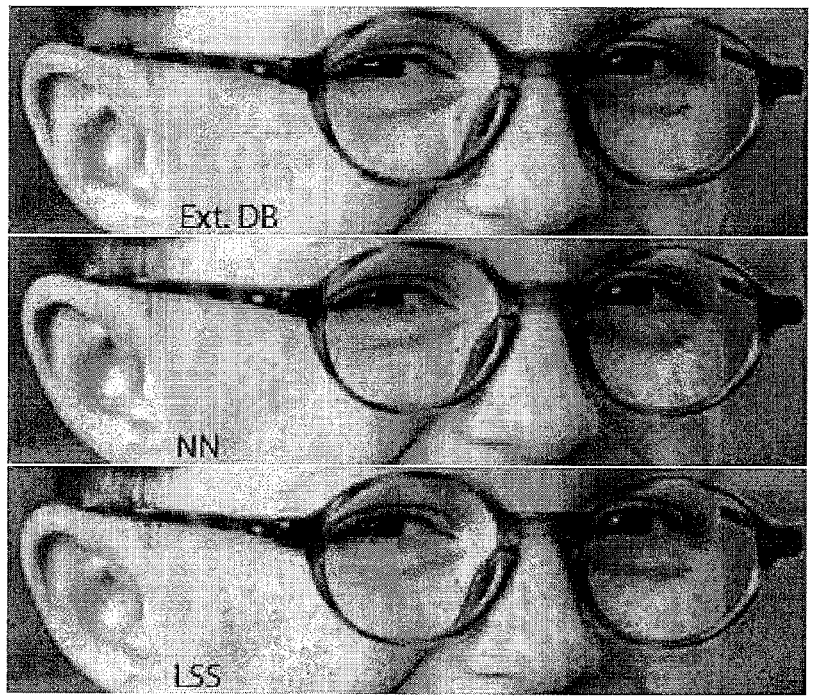
Fig. 6a
Fig. 6b
Fig. 6c
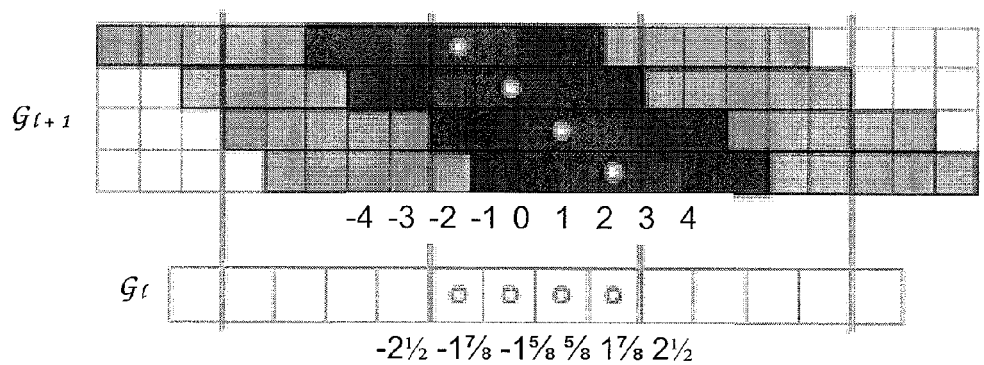
Fig. 7a

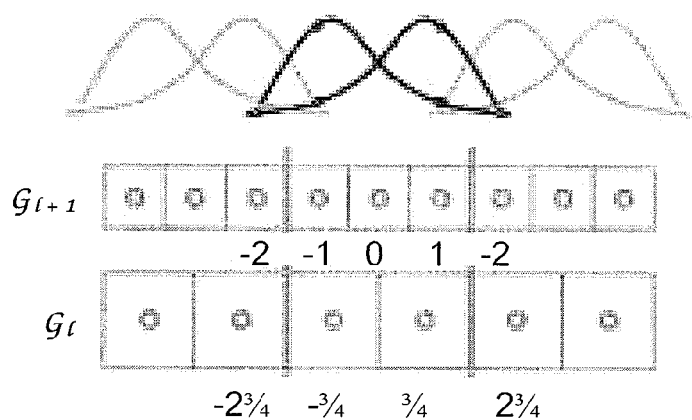
Fig. 7b
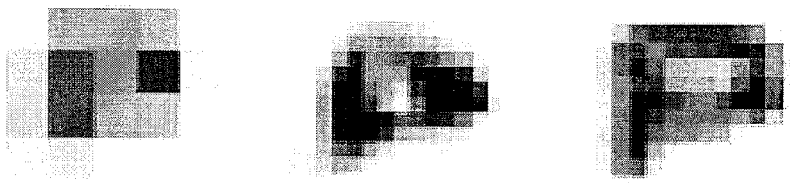
Fig. 8a
Fig. 8b    Fig. 8c    Fig. 8d

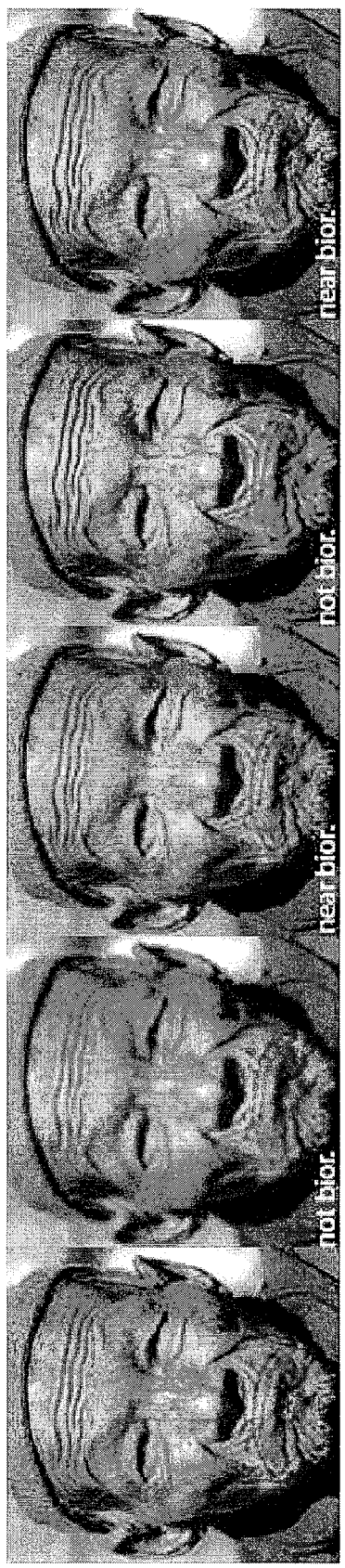

METHOD AND SYSTEM FOR GENERATING AN OUTPUT IMAGE OF INCREASED PIXEL RESOLUTION FROM AN INPUT IMAGE

RELATED APPLICATION

This application claims benefit of provisional application Ser. No. 61/299,036 filed Jan. 28, 2010 whose contents are included herein by reference.

FIELD OF THE INVENTION

This invention relates generally to the field of computer image processing, and more particularly to systems and methods for digital color correction.

PRIOR ART

Prior art references considered to be relevant as a background to the invention are listed below and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] Aly, H. and Dubois, E. 2005. Image up-sampling using total-variation regularization with a new observation model. *IEEE Trans. Image Processing* 14, 10, 1647-1659.

[2] Barnsley, M. 1988. Fractal modelling of real world images. *The Science of Fractal Images*, H.-O. Peitgen and D. Saupe, Eds. Springer-Verlag, New York.

[3] Bhat, P., Zitnick, C. L., Snavely, N., Agarwala, A., Agrawala, M., Curless, B., Cohen, M., and Kang, S. B. 2007. Using photographs to enhance videos of a static scene. *Rendering Techniques* 2007, J. Kautz and S. Pattanaik, Eds. Eurographics, 327-338.

[4] Ebrahimi, M. and Vrscay, E. R. 2007. Solving the inverse problem of image zooming using self-examples. *Proc. ICIAR* 2007. Lecture Notes in Computer Science, vol. 4633. Springer, 117-130.

[5] Farsiu, S., Robinson, M., Elad, M., and Milanfar, P. 2004. Fast and robust multiframe super resolution. *Image Processing, IEEE Transactions on* 13, 10 (October), 1327-1344.

[6] Fattal, R. 2007. Image upsampling via imposed edge statistics. *ACM Trans. Graph.* 26, 3, 95.

[7] Freeman, W. T., Jones, T. R., and Pasztor, E. C. 2002. Example-based super-resolution, *IEEE Comput. Graph. Appl.* 22, 2 (March), 56-65.

[8] Freeman, W. T., Pasztor, E. C., and Carmichael, O. T. 2000. Learning low-level vision. *Int. J. Comput. Vision* 40, 1 (October), 25-47.

[9] Glasner, D., Bagon, S., and Irani, M. 2009. Super-resolution from a single image. *ICCV*09. 349-356.

[10] Li, X. and Orchard, M. T. 2001. New edge-directed interpolation. *IEEE Trans. Image Processing* 10, 10, 1521-1527.

[11] Lin, Z. and Shum, H.-Y. 2004. Fundamental limits of reconstruction-based super-resolution algorithms under local translation. *IEEE Trans. Pattern Anal. Mach. Intell.* 26, 1, 83-97.

[12] Mallat, S. 1999. *A Wavelet Tour of Signal Processing, Second Edition (Wavelet Analysis & Its Applications)*. Academic Press.

[13] Polidori, E. and Dugelay, J.-L. 1995. Zooming using iterated function systems. In *NATO ASI on image coding and analysis*, Jul. 8-17, 1995, Trondheim, Norway.

[14] Pollock, S. and Cascio, I. 2007. Non-dyadic wavelet analysis Optimisation, *Econometric and Financial Analysis*, 167-203.

[15] Pratt, W. K. 2001. *Digital Image Processing: PIKS Inside*. John Wiley & Sons, Inc., New York, N.Y., USA.

[16] Reusens, E. 1994. Overlapped adaptive partitioning for image coding based on the theory of iterated functions systems. *Acoustics, Speech, and Signal Processing, 1994. ICASSP-94, 1994 IEEE International Conference on*. Vol. v. V/569-V/572 vol. 5.

[17] Robert, M. G.-A., Denardo, R., Tenda, Y., AND Huang, T. S. 1997. Resolution enhancement of images using fractal coding. In *Visual Communications and Image Processing '97*. 1089-1100.

[18] Shan, Q., Li, Z., Jia, J., and Tang, C.-K. 2008. Fast image/video upsampling. *ACM Trans. Graph.* 27, 5, 1-7.

[19] Su, D. and Willis, P. 2004. Image interpolation by pixel-level at a dependent triangulation. *Computer Graphics Forum* 23, 2, 189-202.

[20] Suetake, N., Sakano, M., and Uchino, E. 2008. Image super-resolution based on local self-similarity. *Journal Optical Review* 15, 1 (January), 26-30.

[21] Sun, J., Ning Zheng, N., Tao, H., and Yeung Shum, H. 2003. Image hallucination with primal sketch priors. *Proceedings of the IEEE Conference on Computer Vision and Pattern Recognition (CVPR)*. 729-736.

[22] Sun, J., Xu, Z., and Shum, H.-Y. 2008. Image super-resolution using gradient profile prior. *Computer Vision and Pattern Recognition, 2008. CVPR 2008. IEEE Conference on*. 1-8.

[23] Tappen, M. F., Russell, B. C., and Freeman, W. T. 2004. Efficient graphical models for processing images. *Proc. CVPR* 2004. 673-680.

[24] Thévenaz, P., Blu, T., and Unser, M. 2000. Image interpolation and resampling. *Handbook of Medical Imaging, Processing and Analysis*, I. Bankman, Ed. Academic Press, San Diego Calif., USA, 393-420.

[25] Vrscay, E. R. 2002. *From Fractal Image Compression to Fractal-Based Methods in Mathematics*. The IMA Volumes in Mathematics and Its Applications. Springer-Verlag, New York.

[26] Xiong, R., Xu, J., and Wu, F. 2006. A lifting-based wavelet transform supporting non-dyadic spatial scalability. *Image Processing, 2006 IEEE International Conference on*. 1861-1864.

FIELD OF THE INVENTION

This invention relates to image processing and particularly to increasing image resolution, or image upscaling.

BACKGROUND OF THE INVENTION

Increasing image resolution, or image upscaling, is a challenging and fundamental image-editing operation of high practical and theoretical importance. While nowadays digital cameras produce high-resolution images, there are many existing low resolution images as well as low-grade sensors, found in mobile devices and surveillance systems, which will benefit from resolution enhancement. At its essence, image upscaling requires the prediction of millions of unknown pixel values based on the input pixels, which constitute a small fraction of that number. Upscaling is also intimately related to a variety of other problems such as image inpainting, deblurring, denoising, and compression.

Perhaps the simplest form of single-image upscaling predicts the new pixels using analytical interpolation formulae, e.g., the bilinear and bicubic schemes. However, natural images contain strong discontinuities, such as object edges, and therefore do not obey the analytical smoothness these methods assume. This results in several noticeable artifacts along the edges, such as ringing, staircasing (also known as 'jaggies'), and blurring effects. Image upscaling has been studied extensively by the computer graphics, machine vision, and image processing communities. The methods developed over the years differ in their formulation and underline prior image model and the input data they use. Here we briefly describe the main approaches to the problem and the principles behind them. We focus on single-image upscaling methods which is the assumed settings of our new method.

The classic and simplest approach uses linear interpolation in order to predict intermediate pixels values. This method is usually implemented using linear filtering, such as the bilinear and bicubic filters, and it is commonly found in commercial software. These interpolation kernels are designed for spatially smooth or band-limited signals which is often not the case in natural image. Real-world images often contain singularities such as edges and high-frequency textured regions. As a result, these methods suffer from various edge-related visual artifacts such as ringing, aliasing, jaggies, and blurring. Thevenaz et al. [25] provide a more elaborate survey of these methods and their evaluation.

More sophisticated methods adapt the interpolation weights based on the image content. For example, Li et al. [10] adapt the interpolation weights according to the local edge orientations and Su et al. [20] choose three out of the four nearest pixels for linear interpolation. This allows the ringing effects to be reduced and obtains somewhat sharper edges. Non-quadratic smoothness functionals yield a different type of non-linear image regularization which can be used for upscaling. For example, Aly and Dubois [1] enlarge images by minimizing the total variation functional. Shan et al. [19] minimize a similar metric using a sophisticated feedback-control framework that keeps the output image consistent with the input image when downscaling it to the input resolution.

Inspired by recent studies of natural image statistics, several methods use random Markov field models to define a probability density over the space of upscaled images. The output image, in many cases, is computed by maximizing these models. These approaches can be divided to two main classes: ones that define non-parametric example-based models and ones that are based on analytical image modeling.

Example-based image enlargement is explored by Freeman et al. [8] and further developed in [Freeman et al. 7]. This image prediction model relies on a database of example patches that are decomposed into a low-frequency band, i.e., a smoothed version, and the residual higher frequency band. The input image is interpolated to a higher resolution using analytic interpolation and the missing high-frequency band is then predicted from the example patches. The matching is performed according to the low-frequency component of the example patches. This approach is capable of producing plausible fine details across the image, both at object edge and in fine-textured regions. However, lack of relevant examples in the database results in fairly noisy images that show irregularities along curved edges. The use of larger databases is more time consuming due to the added comparisons in the nearest-neighbor searches. The use of approximate nearest neighbor searches offers a limited solution, as it introduces its own errors. Tappen et al. [24] also use a patch-based model and require the output to be consistent with the input.

Motivated by earlier works by Barnsley [2] that study the fractal nature of images and its application to image compression, Robert et al. [18] and Vrscay et al. [26] interpolate images using fractal compression schemes which contain extra decoding steps. This approach suffers from strong block artifacts which can be reduced using overlapping range blocks as disclosed by Reusens [16] and by Polidori et al. [13]. Based on these works, Ebrahimi and Vrscay [4] use the input image at multiple smaller scales as the source for example patches, relying on self-similarity in small patches. While this offers an example database of a limited size compared to universal databases, as we show later, this example data is considerably more relevant to the input image being enlarged. Suetake et al. [21] also use the input image to compute an example codebook which is later used to estimate the missing high-frequency band, in a framework similar to Freeman et al. [7].

Recently, several parametric image models have been proposed for upscaling. These methods fit analytical models to describe various image features that show statistical dependency at different scales. Fattal [6] models the relation between edge descriptors, extracted from the input, and gradients at a higher resolution. A fully analytical prior for the reconstructed edge profile is used by Sun et al. [23]. These approaches are considerably faster than their example-based counterparts and are capable of reproducing sharp edges with no apparent noise. Nevertheless, the resulting images tend to appear somewhat unrealistic as they are made of generic edges that often separate color plateaus. Sun et al. [22] describe a Markov random field that combines example-based and parametric modeling together.

Besides single image upscaling, many works deal with multi-frame super-resolution where multiple shots of the same scene, taken at translational offsets, are used to generate a single high-resolution image of the scene. It has also been proposed to use robust regularization to deal with the noise that limits this operation [5, 11]. Given high-resolution photographs of a static scene Bhat et al. [3] enhance videos of that scene by rendering pixels from the photographs. Recently, Glasner et al. [9] unify the multi-frame and example-based super-resolution techniques and derive a single-image method. This method uses the formalism of multi-frame super-resolution yet relies on self-similarities in the image to obtain samples differing by sub-pixel offsets.

Local Self-Similarity

Freeman et al. [7] use a universal example database of small patches taken from arbitrary natural images. Others rely on self similarities within the image [2, 26, 21, 9]; small patches in natural images tend to repeat themselves within the image and across its scales. This allows the external database to be replaced with the input image itself, taken at smaller scales, as the source for example patches. While this provides a limited number of example patches, compared to external databases of an arbitrary size, the patches found within the input image are more relevant for upscaling it. Thus, in many cases one can use fewer examples and obtain the same or even better results while reducing the time cost involved in the nearest-neighbor searches which is known to be the major bottleneck of nonparametric example-based image models.

SUMMARY OF THE INVENTION

The present invention proposes a new high-quality and efficient single-image upscaling technique that extends existing example-based super-resolution frameworks in several aspects. FIG. 1 demonstrates the inventive approach where a local scale invariance in natural images where small patches 10 are very similar to themselves upon small scaling factors. This property holds for various image singularities such as straight and corner edges, as shown in FIG. 1, which shows image upscaling by exploiting local scale-similarity in natural images. The patches 10 when downscaled are very similar to their cropped version 11. This relation holds for various types of singularities. The invention uses this observation to take the approach of Ebrahimi and Vrscay [4] one step further and search for example patches at extremely localized regions in the input image. Comparing this localized search with other alternatives for obtaining example patches shows that it performs significantly better in terms of both computation time and matching error.

It may also be seen that the scale invariance assumption holds better for small scaling factors, where more example patches of a greater relevance are found. Therefore, in accordance with some embodiments, the invention performs multiple upscaling steps of small scaling factors to achieve the desired magnification size. The invention implements these non-dyadic scalings using dedicated novel filter banks which we derive for general N+1:N upsampling and downsampling ratios. The new filters are designed based on several principles that are used to model the upscaling process. Among these principles is the requirement that the filters be nearly-biorthogonal such that the upsampled image is consistent with the input image at an early stage, before the missing high-frequency band is predicted. This exploits better the input data by reducing the amount of prediction needed at the example-based learning stage and leads to an increased visual realism. While hitherto-proposed methods achieve this requirement by solving large systems of back-projection equations, the filter banks according to the invention achieve this consistency via explicit and thus efficient computation.

In accordance with the invention there is provided a computer-implemented method for generating from an input image having a plurality of pixels an output image of increased pixel resolution, the method comprising:

storing the input image in a first memory;

generating an upscaled image having more pixels than the input image by non-dyadically upscaling the input image so that each pixel in the upscaled image maps to a small number of pixels in the input image;

generating a smoothed image by low-pass filtering the input image;

generating a high detail image in which each pixel value is a difference between a corresponding pixel value in the input image and a corresponding pixel value in the smoothed image;

for each pixel in the upscaled image, identifying a patch containing said pixel together with a small number of neighboring pixels;

finding a best-fit patch within a localized region of the smoothed image by searching for patches in the smoothed image whose location lies in close proximity to a mapped location of the patch in the upscaled image;

correcting each pixel in said patch of the upscaled image by uniquely adding the pixel value of the corresponding pixel in an equivalent patch of the high detail image that corresponds to the best-fit patch of the smoothed image and storing the corrected upscaled image in a second memory for further processing.

The method according to the invention is able to produce high-quality resolution enhancement and may be equally applied to video sequences with no modifications in the algorithm. The localized searches and explicit filter computations according to the invention permit very efficient implementation and report real-time GPU performance when enhancing low-resolution video to high-definition format.

Owing to the high speed of the algorithm it may be used to generate an upscaled output image in real time without sacrificing image quality compared with hitherto-proposed approaches.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 6 compares images upscaled by a factor of 3 using different search techniques;

FIGS. 7a and 7b show grid relation and filter placements;

FIGS. 8a to 8d show an image with repetitions;

FIGS. 9a to 9e show a comparison between nearly biorthogonal filters and filters designed with no such consideration;

DETAILED DESCRIPTION OF EMBODIMENTS

Upscaling Scheme

The basic upscaling scheme used by the invention is closely related to the framework previously used [7, 21, 24]. However, we replace most of the components it uses with novel, application-specific, components that we now describe. The first contribution is an alternative source of example patches that we propose to use. Below we discuss and measure a refined scale similarity property in natural images. The similarity assumptions used by existing methods exploit similarities across the image and at multiple scales of it. We refine this assumption and observe that various singular features in natural images are similar to themselves under small scaling factors. This property, which we call local self-similarity, allows us to search and find relevant example patches in very restricted neighborhoods around the same relative coordinates in the input image. This approach reduces substantially the nearest-patch retrieval times compared to global image searches or searching in external databases.

This is achieved at no apparent visual compromise in the majority of images that do not contain exact repetitions at multiple scales. In our experiments we validate that very relevant patches can be found in the restricted relative neighborhoods in the input image when applying scaling at small factors. Therefore, in order to make this approach effective, we maximize the amount of data present in the example patches and its relevance by scaling the image in multiple steps of small magnification factors. This is done using by our second new component; new dedicated non-dyadic filter banks. These filter banks, which we describe below, define the interpolation and smoothing operators $\mathcal{U}$ and $\mathcal{D}$ that perform scalings at factors smaller than two. Another desirable property these new filter banks achieve is consistency with the input image through explicit computations, without solving the back-projection equations as previous methods do.

Figure 2:
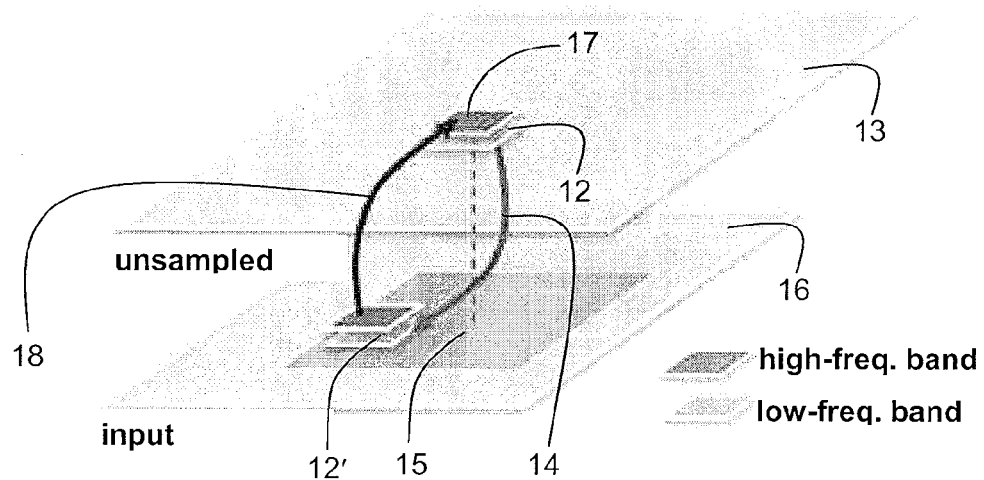
FIG. 2 shows schematically the upscaling scheme according to the invention.

FIG. 2 shows the upscaling scheme according to the invention. A patch 12 of lower frequency band from the upsampled image 13 is matched (arrow 14) with its nearest patch 12' within a small window 15 in the low-passed input image 16. The upper frequency band 17 of the matched patch in the input is used (arrow 18) to fill in the missing upper band in the output upsampled image. Given an input image $I_0$, defined on a coarse grid of pixels $\mathcal{G}_0$, we start off by interpolating it to a finer grid $\mathcal{G}_1$ using our linear interpolation operator $\mathcal{U}$ that maps images from $\mathcal{G}_l$ to $\mathcal{G}_{l+1}$, where $\mathcal{G}_l$ are rectangular pixel grids with resolutions that increase by the scaling factor (that grow with l). This initial upsampled image $\mathcal{L}_l = \mathcal{U}(I_0)$ lacks a fraction of its upper frequency band, proportional to the scaling factor. This missing band is then predicted using a non-parametric patch-based model that does not rely on external example databases but rather exploits the local self-similarity assumption as follows. Example patches are extracted from a smoothed version of the input image $\mathcal{L}_0 = \mathcal{U}(\mathcal{D}(I_0))$, where $\mathcal{D}$ is a downsampling operator that maps images from $\mathcal{G}_l$ to $\mathcal{G}_{l-1}$ and is also defined by our dedicated filter bank. The high-frequency prediction is done by first matching every patch $p \subset \mathcal{G}_l$ in the upsampled image $\mathcal{L}_l$ with its most-similar patch $q(p) \subset \mathcal{G}_0$ in the smoothed input $\mathcal{L}_0$. This search is not performed against every patch in $\mathcal{L}_0$, but rather against restricted small windows (marked 15 in FIG. 2) centered around the same relative coordinates in $\mathcal{G}_0$ as the center coordinates of the query patch p in $\mathcal{G}_l$. As we explain later, this requires the two images to be spectrally compatible which we ensure when designing $\mathcal{U}$ and $\mathcal{D}$. The complement high-frequency content in the input image at the matched patch, $\mathcal{H}_0(q) = I_0(q) - \mathcal{L}_0(q)$, is used to fill-in the missing higher frequency band in the upsampled image by simply pasting it, i.e., $I_1(p) = \mathcal{L}_l(p) + \mathcal{H}_0(q(p))$. Different accounts for the same pixel, due to overlaps between nearby patches are averaged together. The particularities of this scheme are detailed in the next sections.

Figure 1:
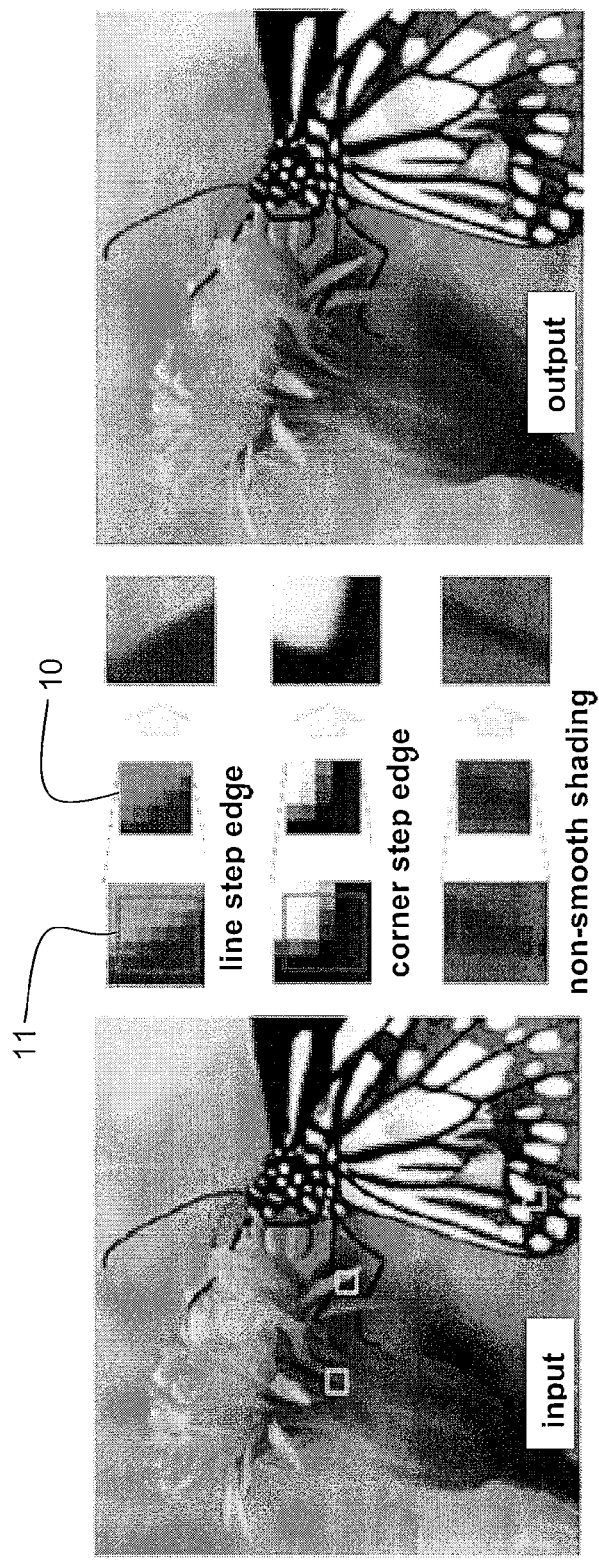
FIG. 1 shows image upscaling by exploiting local scale-similarity in natural images.

The invention refines the self-similarity observation in natural images and show that various singularities such as edges, which commonly appear in natural images and require resolution enhancement, are invariant to scaling transformations and are hence similar to themselves at an instance basis. We call this property local self-similarity since it implies that that relevant example patches can be found at a very restricted set of patches; for every patch in the image, very similar patches can be found in its downscaled (or smoothed) version at localized regions around the same relative coordinates. This is the case for patches containing discontinuities in intensity, i.e., edges in the image, discontinuous first derivative, i.e., shading of faceted surfaces. These isolated singularities can appear at different geometrical shapes, e.g., lines, corners, T-junction, arcs, etc., as shown in FIG. 1. The invention exploits this local similarity to reduce the work involved in the nearest-patch search from being dependent on the number of image pixels, down to being extremely small and fixed. We describe here several examples that quantify the extent to which the local self-similarity holds and compare its use with other patch search methods.

Figure 3:
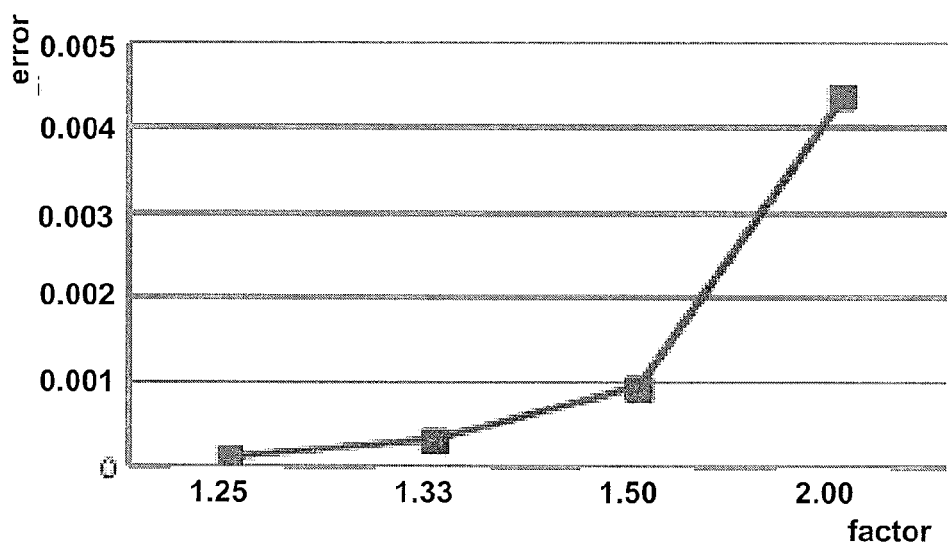
FIG. 3 is a graph showing the error in localized searches when upsampling an image at different scaling factors.
Figures 4A, 4B, 4C:
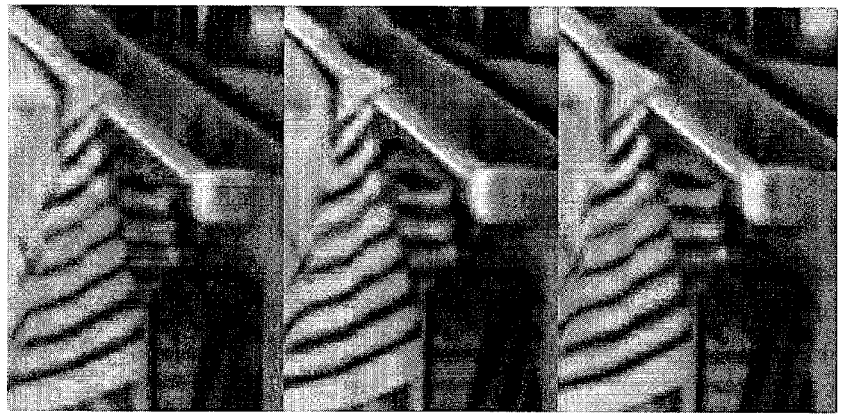
FIGS. 4a to 4c compare between different scaling steps, used to achieve a final magnification factor of 3.

In the first example, we quantify how well the local self-similarity holds at various scaling factors. FIG. 3 shows mean $\mathcal{L}$ error between query and retrieved patches in localized searches when upsampling an image at different scaling factors, computed in RGB color space (pixel values between zero and one) after normalizing each color channel by its average intensity. The query patches are windows of 5-by-5 pixels and the search was performed in windows of $2(N+1)$-by-$2(N+1)$ pixels for scaling factor of $N+1:N$. The graph in the figure shows clearly that error increases as the scaling ratio grows larger. This can be explained as follows. Large scaling factors involve stronger smoothing when computing the example image. This is equivalent to (and implemented by) downscaling the input image by large factors. In this process, image features will become closer to one another and the example patches will no longer contain pure isolated singularities that obey the scale invariance assumption. FIGS. 4a to 4c show how different scaling steps affect the final upscaled image. The scaling sequences used are: (FIG. 4a) 2:1, 3:2, (FIG. 4b) 5:4, 5:4, 4:3, 3:2, and (FIG. 4c) 5:4 repeated five times. The artifacts produced by large factors, dyadic in this case, are clear. Given this, we upscale images by performing multiple scaling steps of small factors to achieve the desired final magnification. The manner in which these small non-dyadic scalings are implemented using dedicated filter banks according to the invention is described below.

Figure 5:
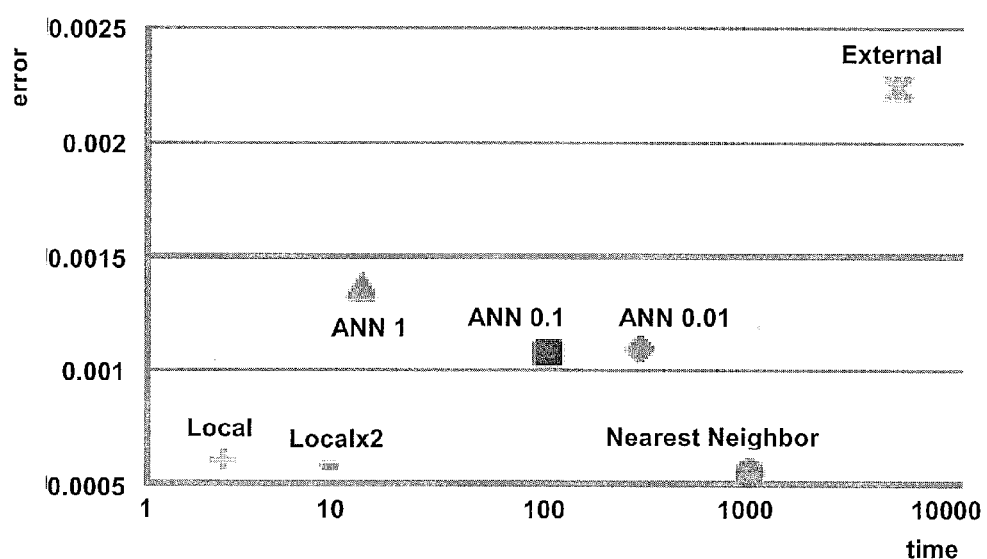
FIG. 5 is a graph showing the error versus the time cost of various search strategies.

In the second example we compare the quality of the patches retrieved by various approaches as well as the running times. Here also, we use patches of 5-by-5 pixels in normalized RGB color space and report the mean values estimated from six test images upscaled by a factor of 5:4. FIG. 5 shows the results obtained using: local searches within windows of 10-by-10 pixels, windows of 20-by-20 pixels, and exact nearest search and approximate nearest neighbor searches in the entire input image. These tests were performed with scaling factor of 5:4 and the time axis of the graph is shown in logarithmic scale. The graph shows that the local search we propose is more accurate and considerably faster than the use of kd-based approximate nearest-neighbor search algorithm set to various error bounds. Searching for the nearest patch exhaustively, in the entire input image, does not achieve a significant gain in accuracy compared to the localized searches—in fact there is an 80% agreement between the two. Indeed, the lack of significant visual difference between these two search strategies is borne out by FIGS. 6a to 6c which show images upscaled by a factor of 3 using nearest search in an external database (Ext. DB), nearest patch within the entire image (NN), and using our localized search (LSS). Searching within windows larger than $2(N+1)$-by-$2(N+1)$ pixels does not achieve a significant gain in quality yet takes more than four times longer to compute.

Furthermore, we tested the use of an external database, consisting of the six images used by Freeman et al. [7] enriched by another highly-detailed image containing the same number of total pixels. Despite having more example patches and the use of an accurate nearest-neighbor search, this option resulted in noticeably higher errors, as shown in FIG. 6. Besides the lower relevance of this database, compared to the image itself, nearest patches computed based on low-frequency band may be ambiguous. Indeed, Freeman et al. [7] match patches also based on the high-frequency component which is being built. This solution introduces spatial dependencies when searching for patches, which undermines the locality and explicitness of computation.

Improvement over Prior Art Approaches

The local self-similarity which is underpinned by the use of example-based image upscaling according to the invention distinguishes the invention over hitherto-proposed approaches. Our tests show that the local searches, this similarity allows, achieve significant speedup at almost no quality cost compared to searching the entire image. However, Glasner et al. [9] show that by searching within the entire input image and across scales, different instances of the same feature may be found. FIGS. 8a to 8d show a case where such repetitions are found and exploited. FIG. 8a shows the input and FIGS. 8b-8d show respectively input pixels of a selected area 19, the output produced by the method of the invention, and the results of Glasner et al. [9]. In order to find these repetitions in the data, Glasner et al. [9] perform a thorough search at multiple scales that differ by small non-dyadic factors and small translational offsets. While this approach increases the nearest-patch search efforts, this type of repetition is scarce compared to the local self-similarities found along most of the edges in general natural images. In addition, in the approach of Glasner et al. the output image is computed by solving the super-resolution as well as back-projection systems of large linear equations. As described below, the invention synthesizes the upscaled image using custom filter banks that consist of local and explicit calculations. Altogether, the approach according to the invention acts locally, both when searching for example patches and when constructing the output image, and allow a fully parallel implementation, as described below.

Non-Dyadic Filter Banks

The main conclusion from the tests described above is that small localized patch searches are effective as long as the scaling factors are small. Therefore, we perform multiple upscaling steps of small factors to achieve the desired magnification. The upscaling scheme, described above, uses analytical linear interpolation V and smoothing D operators to compute the initial upsampled image and the smoothed input image, used for generating the example patches. The choice of these operators is consequential for the invention and several conditions should be obeyed by these filter banks in order to model the image upscaling process. Dyadic image upscaling, where the image dimensions are doubled, typically consists on interpolating the image by adding zeros between every two pixels followed by a filtering step. Dyadic downscaling consists of filtering the image first and then subsampling every other pixel. The downscaling operation is identical to the computation of the coarser level approximation coefficients in the forward wavelet transform, and the upscaling corresponds to the inverse wavelet transform, applied without adding any detail (wavelet) component. In fact, wavelet theory such as disclosed by Mallat [12] is primarily concerned with the design and analysis of such scaling schemes and filter banks. This vast literature offers a countless number of filter banks, obeying all or most of the requirements we are about to discuss here, for computing dyadic transformations. However, very little is available for non-dyadic case, where the scaling factor is other than two. Xiong et al. [27] use the lifting scheme to compute a 3:2 scaling for image coding. Their construction maps a linear function to the same values it contained, while skipping every third value. Hence it does not reconstruct first-order polynomials which, as we shall discuss below, is very important for our application. Pollock et al. [14] describe orthogonal symmetric Shannon-like wavelets that are infinite and hence do not fit our needs. While wavelet packets analysis [12] generalizes the spectral tiling tree, it is still largely implemented in the common dyadic spatial setting.

Here we derive the formalism that extends the dyadic scaling of wavelet transforms to N+1:N scaling factors. FIGS. 7a and 7b illustrate this for the cases of N=2 and N=4. FIG. 7a shows a coarse grid (bottom) placed against the finer grid (top) in a 5:4 ratio. The placement of the non-zero coefficients on the fine grid is shown in red and appears as a denser shade of grey in monochrome. FIG. 7b illustrates the profiles of two filters in a 3:2 scaling factor. As shown in the figures, the relative placement of the coarse $\mathcal{G}_l$ and fine $\mathcal{G}_{l+1}$ grid points has a periodicity of N. Besides the dyadic case, N=1, there is no reason to expect the filters to be strictly translation invariant; they can map a linear ramp function sampled at one grid to the same function sampled at a coarser (or finer) grid, the filters weights will have to adapt to the different relative offsets between the grids (seen in the figures) and therefore be different within each period of N filters. Therefore, with no further spatial dependency, the N+1:N transformations consist of filtering which is translation invariant to periods of N+1 grid points and hence require N distinct filters in order to handle the irregular grids relation. In practice, this means that the downscaling operator can be computed using N standard translation-invariant filtering operations, performed in $\mathcal{G}_{l+1}$, followed by subsampling each filtered image every N+1 pixels to produce the total of N values in $\mathcal{G}_l$. Formally, this is given by $$\mathcal{D}(I)(n) = (I * \bar{d}_p)((\mathcal{N}+1)q+p) \qquad (1)$$

where p=N mod N, q=(N−p)/N, the filters $d_1, \ldots, d_N$ are the N distinct smoothing filters, the filter mirroring is given by $\bar{d}[n] = d[-n]$, and * denotes the discrete convolution. The analog extension of the dyadic case applies to the upsampling step; every sample within the period of N is filtered with a different upsampling filter, $u_1, \ldots, u_N$. These filtered images are then summed as follows:

$$\mathcal{U}(I)(n) = \sum_{k=1}^{N} (\uparrow I * u_k)(n), \qquad (2)$$

where the zero upsampling operator is defined by $(\uparrow I)[\mathcal{N}+1)n] = I[n]$ and zero otherwise.

Filters that constitute a mapping and its inverse are known as biorthogonal filters [12]. In our derivation this relation can be required if we first upsample and then downsample, i.e., $$\mathcal{D}(\mathcal{U}(I)) = I \qquad (3)$$

Applying the operators in the reverse order cannot be expected to result in an identity mapping since $\mathcal{G}_l$ and $\mathcal{G}_{l+1}$ are of different space dimension. Formally, relation (3), between the operators, can be expressed in terms of the filters by $$\langle u_i[n], d_j n - (\mathcal{N}+1)k \rangle = \delta_k \cdot \delta_{i-j}, \qquad (4)$$

for every integer k and 1≤i, j≤N, where $\langle , \rangle$ is the usual dot-product and $\delta_k = 1$ when k=0 and is zero otherwise. The importance of producing an upsampled image that is consistent with the input upon downsampling will become apparent from the following description.

The lack of translation invariance, or the translation invariance in periods of N+1 grid points, introduces a minor complication when generating low- and high-frequency example patches for the high-frequency prediction step of our algorithm. Being different from one another, the N distinct filters respond differently to the same input signal. Therefore, their output must not be mixed in the high-pass prediction step when comparing and pasting patches. To avoid this, we search for examples in offsets of N+1 pixels, such that the same filter responses are always aligned together. We then compensate for this reduction in the number of example patches by creating multiple example images $\mathcal{L}_0 = \mathcal{U} \mathcal{D} (I_0))$ that are produced by offsetting the input image $I_0$ by 1, ..., N+1 pixels along each axis. Thus, altogether the number of example patches remains the same as if we searched in offsets of a single pixel and the filtered values are not intermixed.

Connection to Wavelet Bases

This derivation does not include the high-pass wavelet filters, which normally span the high frequency subspace of the finer space $\mathcal{G}_{l+1}$ that is the complement of the space spanned by the upsampling filters $u_i$. The reason is that we do not use them in our upscaling scheme; the high-pass prediction step fills-in the high-pass layer directly, in pixel values and not detail coefficients (that normally multiply the wavelet filters to get pixel values). Working in pixel resolution avoids the loss of spatial resolution that the wavelet filters introduce and leads to better quality results in the patch-based synthesis.

However, by not restricting the synthesis of the high-frequency layer to the complement high-frequency wavelet space, the lower frequency approximation layer will also be affected by this step, i.e., the upsampled image spanned by $u_i$. Thus, the consistency with the input will be undermined. However, our testing show that the predicted high-frequency layer has an unnoticeable effect upon downsampling and deviates the intensities of the synthesized image from the input by about 1%.

Filter Design

Here we describe the guiding principles which we follow to design the upsampling and downsampling filters such that they model the image upscaling process.

(C1) Uniform scaling. When upscaling and downscaling an image we want the resulting image to differ by a similarity transformation; a spatially-uniform scaling transformation. Such a transformation changes the distance between every two points by a fixed factor, the scaling factor between the image grids. This property can be imposed on our upsampling and downsampling operators by the aid of linear functions. A linear function shows a fixed difference, I(x+dx)−I(x) between points of a fixed distance, dx. Therefore, we require our operators to preserve the shape of linear functions, i.e., map a linear function defined at $\mathcal{G}_l$ to a linear function defined on $\mathcal{G}_{l+1}$ and vice versa. This condition of exactly reproducing linear functions is the counterpart of the vanishing moments condition, commonly used in the wavelet design literature [12].

(C2) Low frequency span. Cameras have a finite point spread function as well as contain a blurring anti-aliasing filter. This is used to restrict the bandwidth of a signal (scene) to approximately satisfy the sampling theorem according to the sensor sampling rate. This has implications on both $\mathcal{D}$ and $\mathcal{U}$. The downscaling operator $\mathcal{D}$ should therefore model the difference in the amount of blurring, needed before sampling signals at $\mathcal{G}_{l+1}$, and the stronger blurring needed for a lower sampling rate of $\mathcal{G}_l$. This lies behind the common practice of designing $\mathcal{D}$ to be a low-pass filter that transfers the lower frequency band [15]. The length of this frequency band is roughly proportional to the scaling ratio, N/(N+1) in our case.

A similar condition applies to the interpolation operator $\mathcal{U}$. As discussed above, the camera filtering limits the signal's spectrum according to the low sampling rate of the input image. The initial upsampled image $\mathcal{L}_l$ should contain this data, rendered at a higher sampling rate. Therefore, the reproducing kernels of $\mathcal{U}$ must span this low-frequency sup-space which spans the lower N/(N+1) band of the spectrum.

(C3) Singularities preservation. The prediction of the missing higher frequency band, and the proper reconstruction of the singularities, as described above, relies on properly matching patches from the initial upsampled image with ones in a smoothed version of the input. In order to obtain accurate matches, the singularities in the smoothed image $\mathcal{L}_0 = \mathcal{U}(\mathcal{D}(I_0))$ and the initial upsampled image $L_1 = U(D(I_0))$ must have a similar shape. This, in fact, poses a condition over the downsampling operator $\mathcal{D}$ rather than the upsampling operator $\mathcal{U}$, since both $\mathcal{L}_0$ and $\mathcal{L}_l$ are constructed by $\mathcal{U}$, meaning that any difference between the two cannot be attributed to $\mathcal{U}$. In practice, this is be met if the downsampling operator $\mathcal{D}$ preserves the shape of edge-like singularities, appearing in $I_0$, when producing $I_{-1}$.

(C4) Consistent and optimal reproduction. Some of the existing approaches [24, 6, 19] require that the final upsampled image should be consistent with the input in the sense that if it is reduced back to the input resolution, it must be identical to the input image. We argue that this should also be the case at an earlier stage; the initial upsampled image $\mathcal{L}_l$ must already be consistent with the input, i.e., $\mathcal{D} = \mathcal{L}_l) = I_0$ as it contains the same information, held in a denser grid. However, since $\mathcal{L}_l = \mathcal{U}(I_0)$, this condition amounts to $\mathcal{D}(\mathcal{U}(I_0)) = I_0$, i.e., the inverse relation defined in (3). In other words, the filters defining the upsampling and downsampling operators must obey the biorthogonality condition (4).

Achieving this property implies that the prediction step is not required to undo the loss (or weakening) of data that would otherwise occur. The importance of this optimal use of the original pixels is demonstrated in FIGS. 9a to 9e where the input image is shown in FIG. 9a. FIGS. 9b and 9c show the initial upsampled image, without running the high-frequency prediction step, after it is downsampled to the input resolution, i.e., $\mathcal{D}(\mathcal{U}(I_0))$. FIGS. 9d and 9e show the output of the upscaling scheme according to the invention. The salient edges are well reproduced in both cases however the lack of biorthogonality leads to a loss of fine details in the image which makes it appear less realistic. The existing methods, mentioned above, enforce this relation over the output image $I_1$ implicitly, by solving $\mathcal{D}(I_1) = I_0$ either using a linear solver or through a nonlinear iterative scheme. By designing our filter banks such that they are nearly biorthogonal, we approximate this condition over $\mathcal{L}_l$ through an explicit and hence efficient computation. Our final image $I_1$ will not be exactly consistent with $I_0$ due to the inexact biorthogonality and the effect of the high-frequency prediction step, explained in the previous section. However, our tests show that the total deviation of $\mathcal{D}(I_1)$ from $I_0$ is of about 2% in pixel intensity value which is visually unnoticeable.

In the Appendix we explain how we use these conditions to define new non-dyadic filter banks. This requires addressing two main difficulties. The first arises from the fact that we need to define compact filters, consisting of a small number of non-zero coefficients, in order to achieve 'simple' low- and high-frequency example images. Filters with large support suffer from interferences in their response to different nearby edges. This undermines the separation between the singularities which is essential for their scale invariance. On the other hand, a small number of degrees of freedom does not allow us to fully obey all the design conditions we listed above. We treat this over-determinedness by relaxing some of the requirements to objectives in an optimization problem rather than treating them as hard constraints. The second difficulty stems from the non-linearity of the bi-orthogonality condition (4). These equations make the filter design hard to solve or optimize for all the unknown filter coefficients at the same time. We overcome this by first computing the downsampling filters $d_j$ with no regard to the biorthogonality condition (4), and then compute ui given $d_j$ while taking into account the biorthogonality.

In Table 1, at the Appendix, we provide the optimal filters we obtained using this framework and used to produce all our results.

Results

We implemented our method in C++ and run it on an Intel Core 2 Quad CPU 2.8 GHz machine. We perform the upscaling using progressively larger scaling ratios for the following reason. As the image size increases nearby singularities become more isolated, allowing us to use stronger smoothing without undermining the scale invariance property of image singularities, discussed above. With this consideration in mind, we approximate the desired magnification factor using the small factors that our filters support, namely, 5:4, 4:3, and 3:2. For example, to achieve a magnification of 3 we use 5:4, 5:4, 4:3, and 3:2, and for a factor of 4 we use 5:4, 5:4, 4:3, 4:3, and 3:2. We then use a simple bicubic downscaling to match the desired magnification factor accurately. We implemented the scheme in the YCbCr color space, where we add high frequencies only to the Y channel. This enables a speedup of about a factor of three compared to using RGB color space. We did not observe a decrease in quality for the scaling factors we tested.

It takes us 4 seconds to upscale an image of 200-by-200 pixels by a factor of 4 along each axis when we run on a single core. Our method is trivially parallel because the different regions in the image are uncoupled in our explicit computation, implying that the running time can be further divided by the number of cores. We exploited this parallel nature of our algorithm and implemented it also on an Nvidia™ Gefroce™ 480GTX GPU, using Cuda 3.0, with no changes in the algorithm. This implementation allows us to upscale videos form 640×360 to 1920×1080 (a factor of 3) at 23.9 FPS (including display time). We used scaling steps of 4:3, 3:2, and 3:2.

We compared the quality of our upscaled images with the results produced by current state-of-the-art methods as well as a leading commercial product Genuine Fractals™, The method of Glasner et al. [9] reconstructs edges that are somewhat sharper than what our method does, but also produces a small amount of ringing and jaggies. Our method performs considerably fewer computations when searching patches and avoids solving large linear systems and hence, even in a single core implementation, it runs more than an order of magnitude faster. Despite being an examples-based method, our running times are also lower than the times reported for methods that use analytical models [6, 18, 22].

Video upscaling.

We used our upscaling method with no further modification to enlarge the resolution of video sequences. Similarly to the method by Shan et al. [18], no flickering artifacts are observed between successive frames. As Shan et al. note, we also observed that the consistency condition C4 is responsible for the stable output. In the supplemental material we compare our method to their and obtain high quality results. Our running times, in both the CPU and GPU implementations, are lower.

Figure 10:
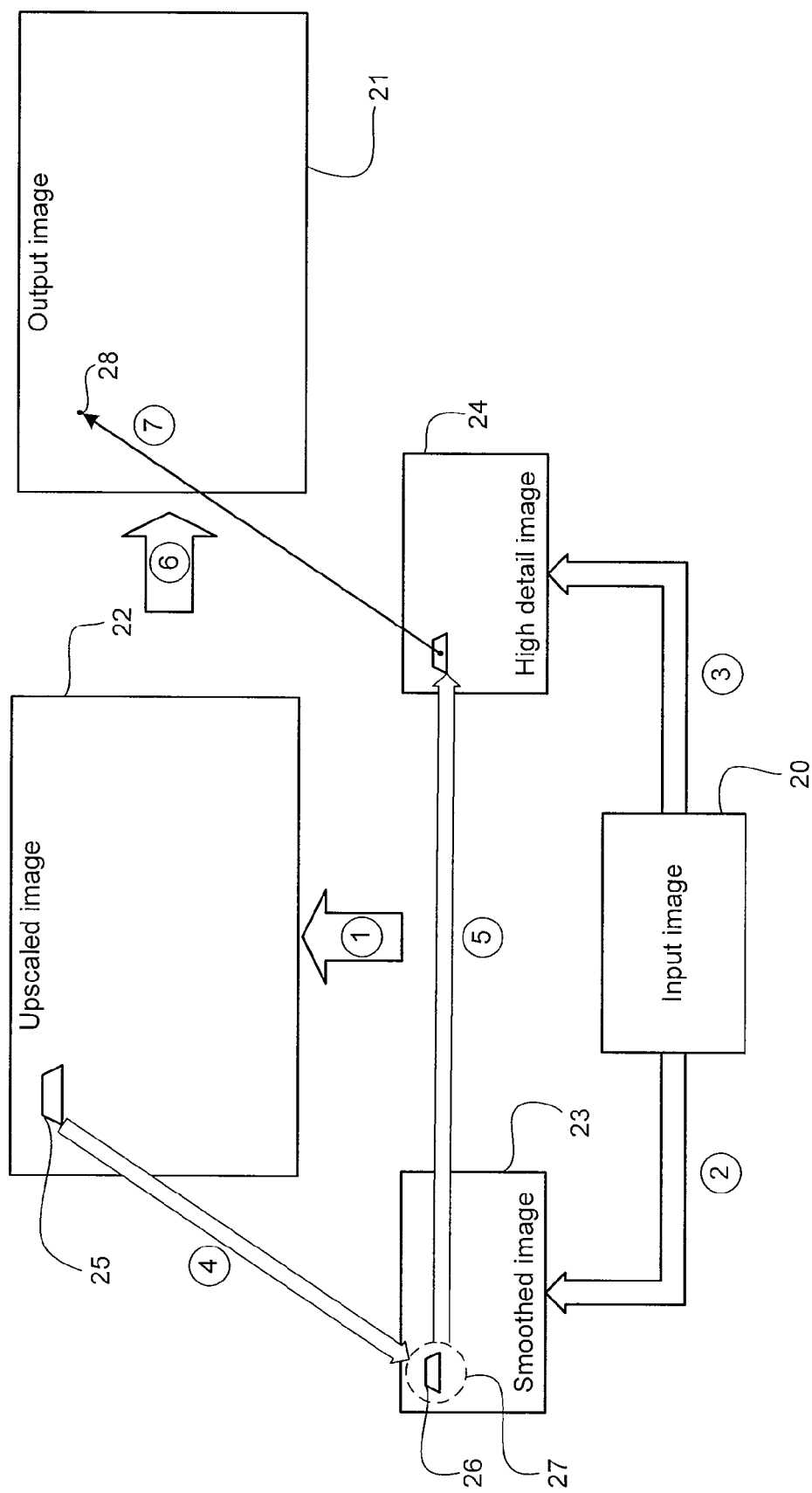
FIG. 10 is a schematic representation of the principal operations carried out in accordance with an embodiment of the invention.

FIG. 10 summarizes the principal operations performed by the method according to the invention for generating from an input image 20 having a plurality of pixels an output image 21 of increased pixel resolution. The method comprises storing the input image in a memory. An upscaled image 22 is generated having more pixels than the input image by non-dyadically upscaling the input image 20 so that each pixel in the upscaled image maps to a small number of pixels in the input image. A smoothed image 23 is generated by low-pass filtering the input image 20 and a high detail image 24 is generated in which each pixel value is a difference between a corresponding pixel value in the input image 20 and a corresponding pixel value in the smoothed image 23.

For each pixel in the upscaled image 22, a patch 25 is identified containing the pixel together with a small number of neighboring pixels. A best-fit patch 26 is found within a localized region 27 of the smoothed image by searching for patches in the smoothed image 23 whose location lies in close proximity to a mapped location of the patch in the upscaled image 22. Each pixel in the patch 25 of the upscaled image 22 is corrected by adding the value of the respective pixel 28 in an equivalent patch of the high detail image 24 that corresponds to the best-fit patch 26 in the smoothed image 23.

Once this is done, successive pixels are processed and for each pixel a different patch is defined. Typically, each pixel is at the center of a patch containing 5×5 pixels although patches of different sizes are also feasible. As successive pixels are processed in this manner, there are thus defined successive overlapping patches corresponding to the respective pixels. It will be appreciated that the pixel value of the corresponding pixel in an equivalent patch of the high detail image 24 that corresponds to the best-fit patch of the smoothed image 23 must be added only once to the output image 21. This may be done in practice either by carrying out the method in a two-pass approach where in a first pass the best fit patches are identified and the pixel value that needs to be added to the output image is determined. In a second pass, the computed pixel values are then added to the output image. In an alternative approach, once a pixel value is added to the output image, the address of that pixel may be locked so as to prevent the high detail value being added in respect of a subsequent patch. In yet another approach, the pixel value associated with the best-fit patch is normalized before adding to the output image so that an average value based on the number of patches is added at each iteration.

It will be appreciated that the best high detail content corresponding to the current pixel cannot be written immediately to the upscaled image since doing so would change the next patch that is extracted for searching for the best example needed for the next pixel. Consequently, the high detail pixel data to be added to the upscaled image must be stored elsewhere (in a high detail buffer) and only when the complete image or sub-image is processed, is it added to the upscaled image to generate the output image.

Further, the high detail pixel data must be normalized before adding to the upscaled image as is now explained. Since a patch contains multiple pixels, successive patches will each contain some of the same pixels. By way of simple example, if each patch contains 5×5 pixels, then if each successive patch is derived by moving a patch horizontally by one pixel, each successive patch will lose five pixels in the previous patch and will gain five new pixels that were not in the previous patch. But the remaining 15 pixels will be in both patches. The high detail data relating to pixels that are common to more than one patch must be written only once to the upscaled image. Therefore before adding the high detail data to the upscaled image to provide the output image, we normalize (divide) each pixel in the high detail buffer by the number of values that were written to it.

Generating the upscaled image includes copying original image values to an upscaled image and subsequently filtering.

The input image may be non-dyadically scaled N:M by creating from the input image N upscaled images and copying successive pixels in the input image to successive ones of the N upscaled images and leaving a gap of M pixels between successive copied pixels. Each of the N images is filtered with a distinct filter; and the N images are then added to produce a composite image.

In accordance with some embodiments, the N distinct filters used for upscaling are adapted to reconstruct constant images accurately such that if all pixels values of the source are the same so too will be pixels values of the upscaled image.

In accordance with some embodiments, the N distinct filters used for upscaling are adapted to reconstruct linear image functions accurately.

The input image may be smoothed by generating from each of the N distinct filters a second set of biorthogonal N filters, and combining corresponding filters in each set of N filters so as to generate another set of distinct filters that are used for smoothing.

Where computer resources are limited or where higher processing speed is required the input image may be split into a plurality of sub-images and the method carried out on each sub-image independently. Processing speed may be increased by processing the sub-images simultaneously.

Figure 11:
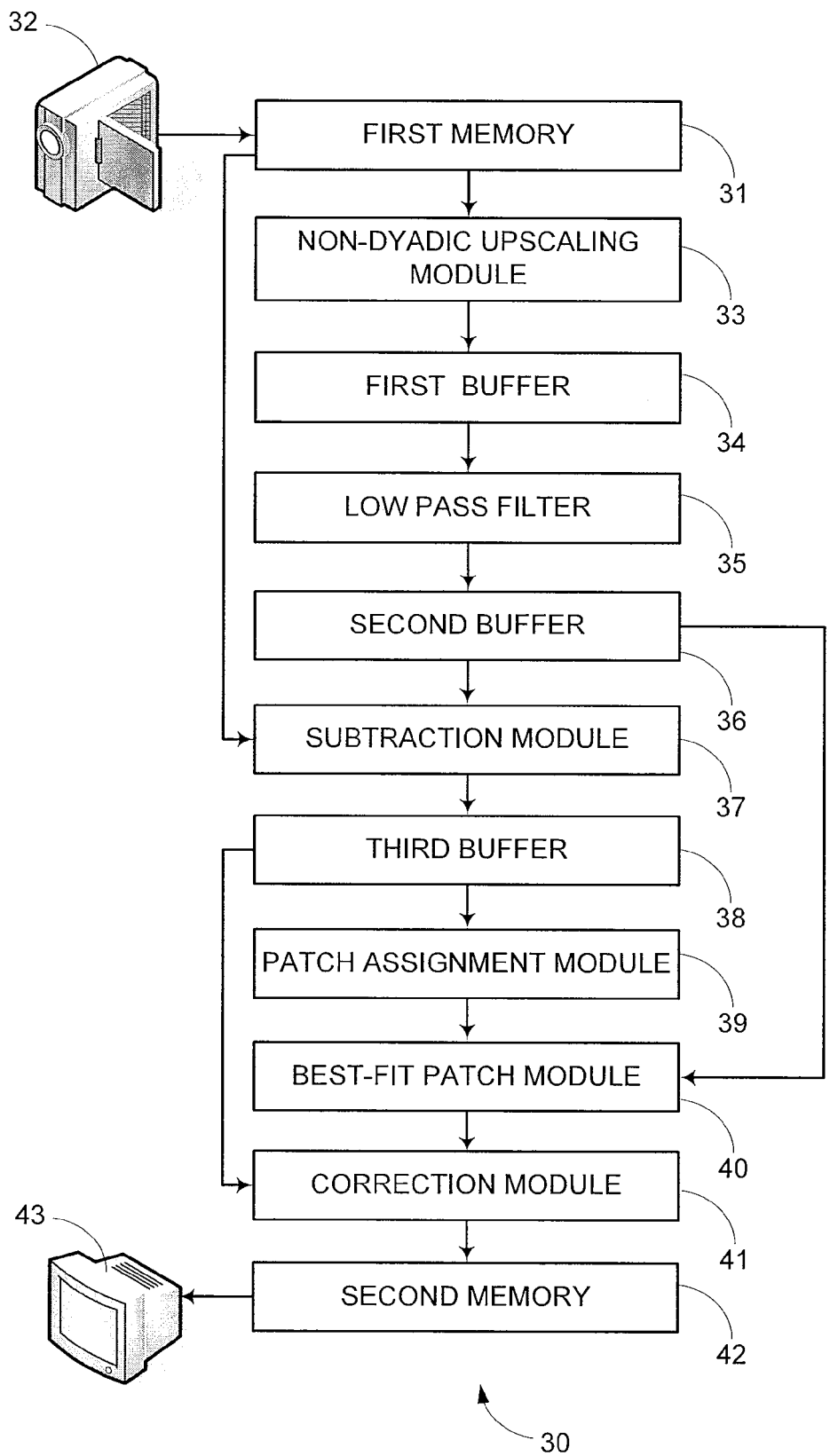
FIG. 11 is a block diagram showing functionality of a system according to the invention comprising a first memory for storing pixel data representative of the input image.

FIG. 11 is a block diagram showing functionality of a system 30 according to the invention comprising a first memory 31 for storing pixel data representative of the input image (20 in FIG. 10). Typically, the image is captured by a camera 32, which may be coupled to the first memory so that camera images are processed in real time. It should be noted that real-time processing is rendered possible by the invention by virtue of the improved algorithm, which allows very fast image processing owing to the fact that high detail is located by searching in only a very small localized area of the smoothed image. Since the smoothed image and the upscaled image are both derived from the input image, such that each pixel in the smoothed image and the upscaled image maps to a respective pixel of the input image, the location of any patch in the upscaled image can be mapped to a small area in the smoothed image for finding the best-fit patch. This avoids the need to process the complete image and permits the high detail to be found very quickly. A non-dyadic upscaling module 33 is coupled to the first memory 31 for generating an upscaled image (22 in FIG. 10) having more pixels than the input image by non-dyadically upscaling the input image so that each pixel in the upscaled image maps to a small number of pixels in the input image. A first buffer 34 is coupled to the non-dyadic upscaling module 33 for storing pixel data representative of the upscaled image.

A low pass filter 35 is coupled to the first memory 35 for generating a smoothed image by low-pass filtering the input image, and a second buffer 36 is coupled to the low pass filter 35 for storing pixel data representative of the smoothed image. A subtraction module 37 is coupled to the first memory 31 and to the second buffer 36 for generating a high detail image (24 in FIG. 10) in which each pixel value is a difference between a corresponding pixel value in the input image and a corresponding pixel value in the smoothed image. A third buffer 38 is coupled to the subtraction module 37 for storing pixel data representative of the high detail image.

A patch assignment module 39 is coupled to the first buffer and adapted to identify successive patches each containing a respective pixel in the upscaled image together with a small number of neighboring pixels. A best-fit patch module 40 coupled to the patch assignment module 39 and to the second buffer 36 searches within a localized region of the smoothed image whose location lies in close proximity to a mapped location of each successive patch in the upscaled image so as to locate a best-fit patch that best matches the respective patch. A correction module 41 is coupled to the best-fit patch module 40 and to the third buffer 38 for correcting each pixel in the patch of the upscaled image by uniquely adding the pixel value of a corresponding pixel in an equivalent patch of the high detail image that corresponds to the best-fit patch of the smoothed image. A second memory 42 is coupled to the correction module for storing corrected pixels of the upscaled image for further processing or for display by a display device 43 coupled thereto.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

APPENDIX

As described above we use two operators: the upscaling operator $\mathcal{U}$, which is used to create the initial upscaled image, and the downscaling operator $\mathcal{D}$, which together with the upscaling operator is used to smooth the input image. Each of these operators is defined by its own set of filters. Here we describe how we design these filters based on the principles C1-4, discussed above under the sub-heading Filter Design. As we explained there, the support of these filters should be kept as compact as possible, in order to avoid mixing the response of the filters to different image features. The design principles pose more conditions than the number of non-zero coefficients we are willing to allocate to the filters. Therefore, we cannot fully obey these conditions and relax some of the requirements to objectives in an optimization problem rather than treating them as hard constraints. In addition, the bi-orthogonality condition C4 creates a non-linear relation between the filters of $\mathcal{U}$ and $\mathcal{D}$ and makes their computation a difficult problem. We overcome this non-linearity by splitting the filter design into two linear sub-problems as follows. The downscaling operator $\mathcal{D}$ models the physical image acquisition process and can therefore be computed first, independently of $\mathcal{U}$. The upsampling filters are computed in a second step and ensure the bi-orthogonality as well as other properties.

In order to model the image acquisition process correctly the downscaling operator $\mathcal{D}$ should perform spatially-uniform scaling. As we explained in C1 this can be required over linear functions; the downscaling operator should map linear functions, defined over $G_{l+1}$, to linear functions, defined over $G_l$. Therefore, we define $\mathcal{L}(x') = x'/a$, where $x \in \mathcal{G}_{l+1}$ and $a$ is the scaling factor $(N+1)/N$, and require $$\mathcal{D}\mathcal{L}(x')(x) = \mathcal{D}(x'/a)(x) = x. \tag{5}$$

In addition to this requirement, we want $\mathcal{D}$ to obey the singularities preservation principle C3, by making sure that a function $f$, that models the singularities, is mapped correctly between the two scales. We implement this by minimizing the distance between the downscaled $f$ and an analytically scaled $f$ as follows:

$$O_1^{\mathcal{D}} = \frac{1}{M} \sum_{\mu,\sigma,x} \left( \mathcal{D}\left(f\left(\frac{x'-\mu}{\sigma}\right)\right)(x) - f\left(\frac{ax-\mu}{\sigma}\right) \right)^2 \quad (6)$$

We use a Gaussian, $f(x)=e^{-x^2}$, to model singularities, and shift it by sub-pixel offsets μ and stretch it by an mount equal to σ to account for all the offsets and scales the data may come in. M is a normalization factor and is equal to the number of summed terms. Furthermore, we want $\mathcal{D}$ to span low frequencies, according to C2, and achieve this by the following objective $$O_2^{\mathcal{D}} = \frac{1}{N} \sum_{\mu,\sigma,x} \|\mathcal{D} d_j\|^2 \quad (7)$$

where $\mathcal{D}$ is the discrete differentiation operator. This is equivalent to minimizing the power spectrum of $\|\hat{\mathcal{D}}(\omega)\|^2/\omega^2$ in Fourier domain, which are the eigenvalues of the Laplacian matrix. Altogether, we get the following constrained optimization problem:

$$\min \cdot O_1^{\mathcal{D}} + \alpha^{\mathcal{D}} O_2^{\mathcal{D}} \text{ s.t., } \mathcal{X}(\mathcal{D}'/a)(\mathcal{X}) = \mathcal{X} \quad (8)$$

where $\alpha^{\mathcal{D}}$ is used to prioritize the two objectives. By applying the Lagrange multipliers rule, we obtain a small linear system of equations which we solve to get $d_j$.

Given the computed the downscaling filters $d_j$, we can now compute the upsampling filters $u_i$ in a similar way. The main difference here is that we optimize for biorthogonality condition C4 and omit the singularities preservation objective term. The biorthogonality condition is achieved by relaxing (3) to the following objective $$O_1^{\mathcal{U}} = \frac{1}{M'} \sum_{k} \sum_{i,j=1}^{N} (\langle u_i[n], d_j[n-(N+1)k] \rangle - \delta_k \cdot \delta_{i-j})^2 \quad (9)$$

where k spans the indices where adjacent $d_j$ overlap $u_i$, and $\mathcal{M}'$ is a normalization constant equal to the number of terms summed. This term promotes a dot product of one between corresponding downscaling and upscaling filters and zero otherwise.

As in the computation of $d_j$, we want $u_i$ to span low frequencies, according to C2, and achieve this by a similar term, $$O_2^{\mathcal{U}} = \frac{1}{N} \sum_{i=1}^{N} \|\mathcal{D} u_i\|^2 \quad (10)$$

We optimize both objectives subject to the uniform scaling constraint C1 which is, in this case, $$\mathcal{U}(\mathcal{L}'(\mathcal{X}))\mathcal{X} = \mathcal{X}(a\mathcal{U}')(\mathcal{X}) = \mathcal{X} \quad (11)$$

where $(\mathcal{L}'(x))(x) = ax'$. Finally, the resulting optimization problem for $u_i$ is $$\min \cdot O_1^{\mathcal{U}} + \mathcal{U} \text{ s.t., } \alpha^{\mathcal{U}} O_2^{\mathcal{U}} (a\mathcal{X}')(\mathcal{X}) = \mathcal{X} \quad (12)$$

where $\alpha^{\mathcal{U}}$ is used to prioritize the two objectives.

In Table 1 we provide the filters we constructed using these calculations. The coefficients in bold correspond to the centers of the filters.

TABLE 1

Filter bank coefficients

| ratio | filter | −3 | −2 | −1 | 0 | 1 | 2 | 3 |
|---|---|---|---|---|---|---|---|---|
| 5:4 | $d_0$ | −0.013 | −0.017 | 0.074 | 0.804 | 0.185 | −0.045 | 0.011 |
| | $d_1$ | −0.005 | 0.032 | −0.129 | 0.753 | 0.421 | −0.09 | 0.017 |
| | $d_2$ | 0.017 | −0.09 | 0.421 | 0.753 | −0.129 | 0.032 | −0.005 |
| | $d_3$ | 0.011 | −0.045 | 0.185 | 0.804 | 0.074 | −0.017 | −0.013 |
| | $u_0$ | −0.028 | −0.053 | 0.061 | 0.925 | 0.304 | 0.007 | 0.014 |
| | $u_1$ | 0 | 0.038 | −0.086 | 0.862 | 0.52 | −0.128 | 0.062 |
| | $u_2$ | 0.062 | −0.128 | 0.52 | 0.862 | −0.086 | 0.038 | 0 |
| | $u_3$ | 0.014 | 0.007 | 0.304 | 0.925 | 0.061 | −0.053 | −0.028 |
| 4:3 | $d_0$ | −0.015 | −0.016 | 0.073 | 0.772 | 0.219 | −0.044 | 0.01 |
| | $d_1$ | 0.014 | −0.093 | 0.578 | 0.578 | −0.093 | 0.015 | 0 |
| | $d_2$ | 0.01 | −0.044 | 0.219 | 0.772 | 0.073 | −0.016 | −0.015 |
| | $u_0$ | −0.042 | −0.041 | 0.069 | 0.928 | 0.365 | −0.008 | 0.03 |
| | $u_1$ | 0.029 | −0.056 | 0.726 | 0.726 | −0.056 | 0.0293 | 0 |
| | $u_2$ | 0.03 | −0.008 | 0.365 | 0.928 | 0.069 | −0.041 | −0.042 |
| 3:2 | $d_0$ | 0 | −0.022 | 0.974 | 0.227 | 0 | 0 | 0 |
| | $d_1$ | 0 | 0 | 0 | 0.227 | 0.974 | −0.022 | 0 |
| | $u_0$ | −0.1 | 0.119 | 0.927 | 0.6 | −0.047 | 0 | 0 |
| | $u_1$ | 0 | 0 | −0.047 | 0.6 | 0.927 | 0.119 | −0.1 |

The invention claimed is:

1. A computer-implemented method for generating from an input image having a plurality of pixels an output image of increased pixel resolution, the method comprising:
    storing the input image in a first memory;
    generating an upscaled image having more pixels than the input image by non-dyadically upscaling the input image so that each pixel in the upscaled image maps to a small number of pixels in the input image;
    generating a smoothed image by low-pass filtering the input image;
    generating a high detail image in which each pixel value is a difference between a corresponding pixel value in the input image and a corresponding pixel value in the smoothed image;
    for each pixel in the upscaled image, identifying a patch containing said pixel together with a small number of neighboring pixels;
    finding a best-fit patch within a localized region of the smoothed image by searching for patches in the smoothed image whose location lies in close proximity to a mapped location of the patch in the upscaled image;
    correcting each pixel in said patch of the upscaled image by uniquely adding the pixel value of the corresponding pixel in an equivalent patch of the high detail image that corresponds to the best-fit patch of the smoothed image; and
    storing the corrected upscaled image in a second memory for further processing.

2. The method according to claim 1, wherein generating the upscaled image includes copying original image values to an upscaled image and subsequently filtering.

3. The method according to claim 1, wherein non-dyadic N:M scaling comprises:
    creating from the input image N upscaled images;
    copying successive pixels in the input image to successive ones of the N upscaled images and leaving a gap of M pixels between successive copied pixels;
    filtering each of the N images with a respective distinct filter; and
    adding the N images to produce a composite image.

4. The method according to claim 3, wherein the N distinct filters used for upscaling are adapted either to reconstruct constant images accurately or to reconstruct linear image functions accurately.

5. The method according to claim 3, wherein smoothing includes:
generating from each of the N distinct filters a second set of biorthogonal N filters; and
combining corresponding filters in each set of N filters so as to generate another set of distinct filters that are used for smoothing.

6. The method according to claim 1, wherein the output image is generated in real time.

7. The method according to claim 1, wherein the input image and the output image are successive images of respective video sequences.

8. The method according to claim 1, wherein the input image is split into a plurality of sub-images and the method is carried out on each sub image independently.

9. The method according to the claim 8, wherein the sub-images are processed simultaneously.

10. A system for generating from an input image having a plurality of pixels an output image of increased pixel resolution, the system comprising:
a first memory for storing pixel data representative of the input image;
a non-dyadic upscaling module coupled to the first memory for generating an upscaled image having more pixels than the input image by non-dyadically upscaling the input image so that each pixel in the upscaled image maps to a small number of pixels in the input image;
a first buffer coupled to the non-dyadic upscaling module for storing pixel data representative of the upscaled image;
a low pass filter coupled to the first memory for generating a smoothed image by low-pass filtering the input image;
a second buffer coupled to the low pass filter for storing pixel data representative of the smoothed image;
a subtraction module coupled to the first memory and to the second buffer for generating a high detail image in which each pixel value is a difference between a corresponding pixel value in the input image and a corresponding pixel value in the smoothed image;
a third buffer coupled to the subtraction module for storing pixel data representative of the high detail image;
a patch assignment module coupled to the first buffer and adapted to identify successive patches each containing a respective pixel in the upscaled image together with a small number of neighboring pixels;
a best-fit patch module coupled to the patch assignment module and to the second buffer and adapted to search within a localized region of the smoothed image whose location lies in close proximity to a mapped location of each successive patch in the upscaled image so as to locate a best-fit patch that best matches the respective patch;
a correction module coupled to the best-fit patch module and to the third buffer for correcting each pixel in said patch of the upscaled image by uniquely adding the pixel value of a corresponding pixel in an equivalent patch of the high detail image that corresponds to the best-fit patch of the smoothed image; and
a second memory coupled to the correction module for storing corrected pixels of the upscaled image.

11. The system according to claim 10, wherein the non-dyadic upscaling module is adapted to copy pixel values of an input image to an upscaled image and subsequently filtering.

12. The system according to claim 10, wherein the non-dyadic upscaling module is adapted to perform non-dyadic N:M scaling by:
creating from the input image N upscaled images;
copying successive pixels in the input image to successive ones of the N upscaled images and leaving a gap of M pixels between successive copied pixels;
filtering each of the N images with a respective distinct filter; and
adding the N images to produce a composite image.

13. The system according to claim 12, wherein the N distinct filters used for upscaling are adapted either to reconstruct constant images accurately or to reconstruct linear image functions accurately.

14. The system according to claim 12, wherein the low pass filter is adapted to generate from each of the N distinct filters a second set of biorthogonal N filters; and
combining corresponding filters in each set of N filters so as to generate another set of distinct filters that are used for smoothing.

15. The system according to claim 10, wherein the first memory is coupled to a camera for capturing the input image in real time.

16. The system according to claim 10, wherein the input image and the output image are successive images of respective video sequences.

17. The system according to claim 10, being adapted to process a plurality of sub-images of the input image independently.

18. The system according to claim 17, being adapted to process the sub-images simultaneously.

19. The system according to claim 10, wherein the second memory is coupled to a display device for displaying the output image.

20. A non-transitory computer readable medium storing computer program code for performing the method of claim 1 when said program is run on a computer.

* * * * *